United States Patent [19]

Craig

[11] Patent Number: 4,898,202

[45] Date of Patent: Feb. 6, 1990

[54] FERTILIZER CONTAINER FOR SPRINKLER SYSTEM

[76] Inventor: James R. Craig, 2925 Cody St., Riverside, Calif. 92503

[21] Appl. No.: 352,923

[22] Filed: May 16, 1989

Related U.S. Application Data

[63] Continuation-in-part of Ser. No. 205,062, Jun. 10, 1988, which is a continuation-in-part of Ser. No. 78,165, Jul. 27, 1987, Pat. No. 4,750,512.

[51] Int. Cl.$^4$ .............................................. B01D 11/02
[52] U.S. Cl. ....................................... 137/268; 422/276
[58] Field of Search ........................... 137/268, 205.5; 422/281, 282, 276, 277

[56] References Cited

U.S. PATENT DOCUMENTS

| | | | |
|---|---|---|---|
| 528,441 | 10/1894 | Muller | 137/268 |
| 3,323,539 | 6/1967 | Schneider | 137/268 |
| 4,407,322 | 10/1983 | Moore | 137/268 |
| 4,662,387 | 5/1978 | King | 137/268 |
| 4,750,512 | 6/1988 | Craig | 137/268 |

Primary Examiner—Alan Cohan
Attorney, Agent, or Firm—Willie Krawitz

[57] ABSTRACT

A fertilizer applicator for solid fertilizer is provided, and is inserted into a sprinkler line system. The applicator comprises a container component which encloses and suspends a fertilizer holder component and spaces the two conponents to define a water pressurization chamber therebetween. Water is fed from the container through the pressurization chamber and into the bottom of the fertilizer container where it dissolves some of the fertilizer and forms a leached, concentrated solution. This leached solution rises through the fertilizer and into overflow tubes where it drains downwardly through the bottom of the fertilizer holder. The concentrated solution is then diluted with water draining from the bottom of the water pressurization chamber, and the diluted solution of fertilizer is passed into the sprinkler system for application to vegetation. The applicator has no moving parts, and has a simplified design. The applicator reduces problems due to plugged drain bores, and channeling effects through the solid fertilizer.

4 Claims, 1 Drawing Sheet

FERTILIZER CONTAINER FOR SPRINKLER SYSTEM

BACKGROUND OF THE INVENTION

This application is a continuation-in-part of U.S. patent application Ser. No.: 205,062 filed June 10, 1988 which in turn is a continuation-in-part of Ser. No. 78,165 filed July 27, 1987 now U.S. Pat. No. 4,750,512 issued June 14, 1988, both entitled: "FERTILIZER CONTAINER FOR SPRINKLER SYSTEM".

This invention relates to a new and improved fertilizer applicator for use with sprinkler systems. Various types of these systems have been disclosed in U.S. Pat. Nos. 528,441; 2,135,932; 2,994,561; 2,323,539; 3,367,353; 3,375,976; 3,669,357; 3,833,177; 3,943,960; 4,026,673; 4,456,176; 4,545,396; 4,635,848; and, 4,662,387.

These devices tend to be cumbersome, complicated, and some require moving parts. Other devices employ meters which are in themselves expensive. Many of these components could be eliminated if the fertilizer applicator system were pre-calibrated in terms of fertilizer solubility, and outlet orifice size.

Also in many instances, it would be desirable to add liquid ingredients to the solid fertilizer when feeding into a sprinkler system. These liquid ingredients could include insecticides, herbicides, and various fertilizers which are relatively expensive such as chelates, hormones, and other specialty chemicals.

In Applicant's U.S. Pat. No. 4,750,512 and in Applicant's co-pending application Ser. No.: 205,062, there are disclosed fertilizer applicators in which water from a supply line is fed to the top of the fertilizer container and then percolates downwards through the fertilizer. Leached, concentrated liquid fertilizer is passed out the fertilizer container and is blended with water which passes through separate outlet bores, and the diluted liquid fertilizer then flows out of the applicator to the sprinkler system.

The problem with these devices is that channeling could occur when the water percolates downwards in the fertilizer container, and this will result in a non-uniform flow of fertilizer solution which is leached from the container.

Another problem with these prior art devices is the possibility that one or more outlet perforations may cake and become plugged, and this could impair the overall function of the device. It would be desirable to overcome these problems and also simplify the construction and operation of these fertilizer applicators.

THE INVENTION

According to the invention, there is provided a fertilizer applicator comprising an external container, and an internal fertilizer holder mounted within the container, the fertilizer holder being spaced from the container to define a water pressurisation chamber therebetween. The lower portion of the fertilizer holder includes a flange having outlet bores which define the bottom of the water pressurisation chamber.

Water is fed from the external container through the water pressurisation chamber and led through a tube into the lower portion of the fertilizer holder. The water then percolates upwardly through the fertilizer, and the concentrated solution of fertilizer overflows into a plurality of tubes and is passed through outlet bores in the bottom of the fertilizer holder. The concentrated solution is combined and diluted with water passing through the outlet bores in the bottom of the water pressurisation chamber.

The outlet bores are sized to provide flow rates through the fertilizer and subsequent dilution which are adequate to prevent the fertilizer from burning plants, foliage, etc., and at the same time to provide reasonable flow rates from the fertilizer applicator.

DESCRIPTION OF THE PREFERRED EMBODIMENTS

Figure 1:
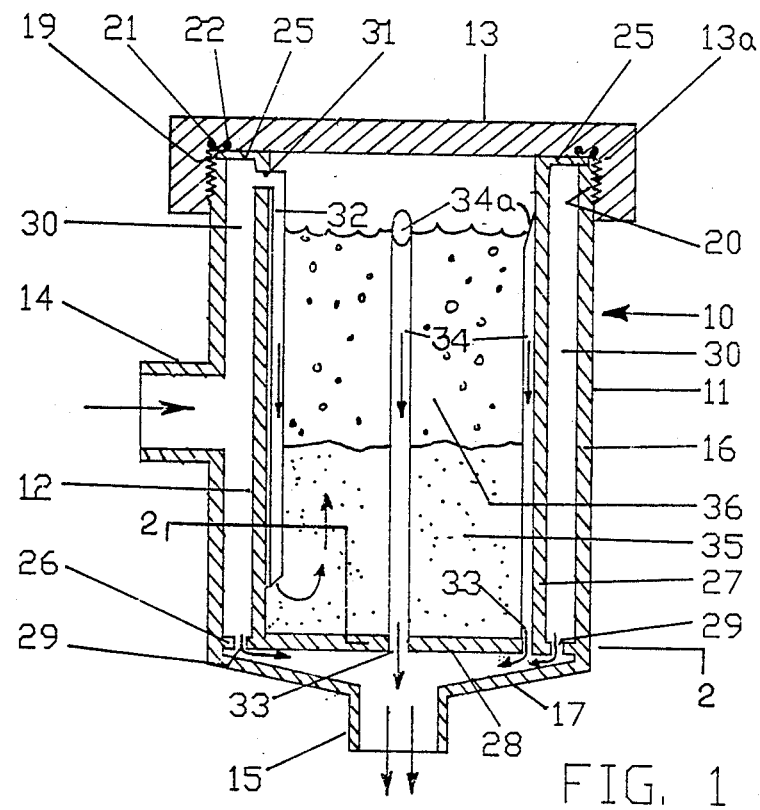
FIG. 1 is a sectional view in side elevation of the fertilizer applicator of this invention; and, FIG. 2 is a view of the device taken along lines 2—2 of FIG. 1.
Figure 2:
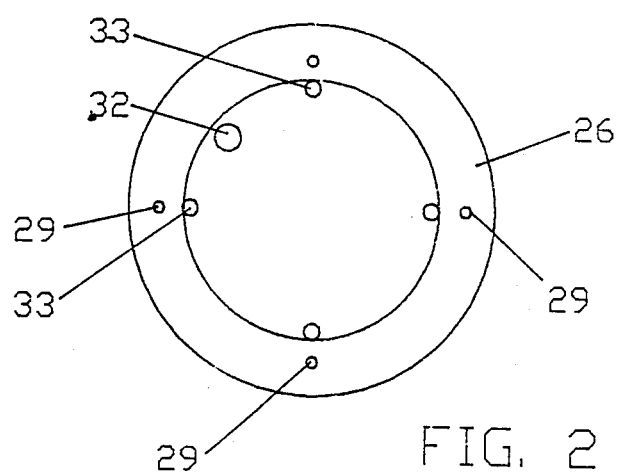

The fertilizer applicator 10 of this invention is shown in FIGS. 1 and 2, and comprises an outer container 11 and a removable fertilizer holder 12 suspended in the container, and closed by a cover 13 which is attached to the container 11 along cover threads 13a.

The container includes a water inlet 14, and outlet 15 for dilute fertilizer solution, a circular sidewall 16, and a conical bottom portion 17. The sidewall 16 provides an upper shoulder 19 and is threaded 20 to engage the threads 13a of the cover 13. O-rings 21, 22 are employed to seal the cover and prevent liquid fertilizer from leaking out from the applicator.

The fertilizer holder 12 includes upper and lower circular flange elements 25, 26 joined or integrally formed with a circular sidewall 27 and a bottom 28. The upper flange 25 rests on the shoulder 19 and the lower flange 26 forms a sliding fit with the sidewall 16 of the container 11. A plurality of outlet bores 29 are formed on the lower flange 26. The sidewall 27 of the fertilizer holder 12 is spaced from the sidewall 16 of the container 11 to define a pressure chamber 30. An inlet bore 31 is provided on the upper portion of the sidewall 27 and leads to an inlet line 32 mounted into or connected within the inlet bore 31 and positioned adjacent the sidewall 27. The inlet line extends downwardly to near the bottom 28 of the fertilizer holder.

A plurality of outlet bores 33 are provided on the bottom 28 of the fertilizer holder and connect into upstanding drain pipes 34 having entry ports 34a at their upper ends.

Solid fertilizer 35 in the form of granules, powder, pellets, etc., is placed into the fertilizer holder 12 for leaching out by water. Alternatively, the fertilizer may be placed in porous bags for loading into the fertilizer holder, and this reduces the presence of unhealthful dust when loaded into the fertilizer holder, compared to the loading of loose, solid material.

Other liquid and solid ingredients may be included with the solid fertilizer such as plant growth regulants, hormones, herbicides, fungicides, weedicides insecticides, soil penetrants, liquid fertilizer, etc. The liquids may be applied to and absorbed by the solid fertilizer for subsequent leaching, and this enables a wider spectrum of materials which can be used without requiring a change of equipment.

Water from a sprinkler system (not shown) is fed to the inlet 14 of the fertilizer applicator 10, fills the pressure chamber 30, and overflows through the inlet line 32 and onto the bottom of the fertilizer holder 12 where it contacts and dissolves some of the fertilizer. A lesser amount of water will drain through the outlet bores 29 of the lower flange 26 at the bottom of the pressure chamber 30.

The concentrated solution 36 of fertilizer then rises to the upper portion of the fertilizer holder, and to the level of the entry ports 34a of drain pipes 34. The concentrated solution 36 will then pass downwardly through the entry ports 34a and drain pipes 34 and out the outlet bores 33, and will be diluted with water draining from the outlet bores 28. The sizes and number of bores 28 and 33 will determine the extent of dilution of the concentrated solution of fertilizer. The diluted solution of fertilizer is then passed through the outlet 15 and back into the sprinkler system for spraying onto vegetation.

The fertilizer applicator of this invention has no moving parts, and the possibility of a plugged drain bore is greatly reduced. Also, problems due to channeling have been practically eliminated. Moreover, the use of screens has been eliminated, and the container construction has been simplified.

I claim:

1. A fertilizer applicator for a sprinkler system, comprising:
   A. a container for holding said solid fertilizer, including: integrally formed upper and lower end flange members, a continuous sidewall member and bottom member joined thereto, the bottom member providing at least one outlet bore and corresponding connecting upstanding drain pipes having upper entry ports for a solution of fertilizer to pass therethrough, the said sidewall providing an inlet bore, and connecting water line terminating near the bottom member for water to pass therethrough at a controlled rate and dissolve the said solid fertilizer, the lower flange member providing bores to permit water to drain therethrough;
   B. an enclosure case for the container, including:
      i. water inlet and outlet means, for water and diluted fertilizer solution, respectively;
      ii. a sidewall portion for enclosing the sidewall member of the container;
      iii. the container being removably secured by the upper flange member to the enclosure, thereby spacing the sidewall portion of the enclosure case and the sidewall member of the container;
   whereby:
      i. water fed into the inlet will be pressured between the sidewalls and through the inlet bore of the sidewall member to dissolve the fertilizer, and form a solution of fertilizer which rises to the level of the entry ports of the drain pipes;
      ii. water draining from the bores in the lower flange member will dilute the fertilizer solution draining from the drain pipes and connecting outlet bores to reduce fertilizer burning; and,
      iii. when the fertilizer is dissolved, water is passed through the bores of the lower flange member and the outlet bores of the bottom member and outlet of the applicator, and then to the sprinkler system.

2. The fertilizer applicator of claim 1, in which the solid fertilizer contains a liquid absorbed therein.

3. The fertilizer applicator of claim 2, in which the said liquid is selected from the class consisting of: insecticides, fungicides, weedicides, herbicides, plant growth regulants, hormones, soil penetrants and fertilizers.

4. The fertilizer applicator of claim 3, in which the fertilizer is contained in a water permeable bag.

* * * * *